United States Patent
Hu et al.

(10) Patent No.: US 7,127,056 B2
(45) Date of Patent: Oct. 24, 2006

(54) DYNAMIC ADAPTATION TO CONGESTION IN CONNECTION-ORIENTED NETWORKS

(75) Inventors: Qingwen Hu, Kanata (CA); Michael L. Aalders, Nepean (CA); Darek R. Skalecki, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 446 days.

(21) Appl. No.: 09/745,525

(22) Filed: Dec. 26, 2000

(65) Prior Publication Data

US 2003/0016808 A1    Jan. 23, 2003

(51) Int. Cl.
*H04M 7/00*   (2006.01)

(52) U.S. Cl. .................. 379/221.03; 379/221.01; 379/114.02; 370/395.1; 370/395.2; 370/395.4; 370/395.21; 370/395.41; 370/395.42; 370/395.43; 370/389; 370/235; 370/230

(58) Field of Classification Search ........... 379/221.03, 379/114.02, 221.01; 370/395.1, 395.2, 395.4, 370/395.21, 395.41, 395.42, 395.43, 389, 370/235, 230

See application file for complete search history.

(56) References Cited

U.S. PATENT DOCUMENTS

| | | | | |
|---|---|---|---|---|
| 4,484,030 | A * | 11/1984 | Gavrilovich | 370/248 |
| 4,669,113 | A * | 5/1987 | Ash et al. | 379/221.01 |
| 4,991,204 | A * | 2/1991 | Yamamoto et al. | 379/221.01 |
| 5,253,288 | A * | 10/1993 | Frey et al. | 379/221.03 |
| 5,953,403 | A * | 9/1999 | Lefort et al. | 379/221.03 |
| 6,377,677 | B1 * | 4/2002 | Ackerley et al. | 379/279 |
| 6,738,351 | B1 * | 5/2004 | Qureshi et al. | 370/235 |
| 2002/0051456 | A1 * | 5/2002 | Kinnunen | |

OTHER PUBLICATIONS

The ATM Forum Technical Committee, "Private Network Interface Specification Version 1.0 (PNNI 1.0)," af-pnni-0055.000, Mar. 1996, pp. i-xviii & 1-366.
Awduche, et al. "RSVP-TE: Extensions to RSVP for LSP Tunnels", Feb. 2000, pp. 1-63, <draft-ietf-mpls-rsvp-lsp-tunnel-05.txt>.
R. Callon, et al., "A Framework for Multiprotocol Label Switching", Sep. 1999, Work in Progress, pp. 1-85, <draft-ietf-mpls-framework-05.txt>.
Bilel Jamoussi, "Constraint-Based LSP Setup using LDP", Sep. 1999, pp. 1-51, <draft-ietf-mpls-cr-ldp-03.txt>.
E. Rosen, et al., "Multiprotocol Label Switching Architecture", Aug. 1999, Work in Progress, pp. 1-80, <draft-ietf-mpls-arch-06.txt>.

* cited by examiner

*Primary Examiner*—Quynh H. Nguyen
(74) *Attorney, Agent, or Firm*—Withrow & Terranova, PLLC

(57) ABSTRACT

Dynamic adaptation of connection-oriented networks is introduced wherein, once congestion is encountered, dynamic adaptation steps may be performed. Four adaptation steps are proposed for reacting to various network congestion scenarios. It is further recommended that the steps are performed in a particular order such that the higher severity and longer sustentation of the network congestion the more strict step is performed to alleviate the network congestion. At a switch in the connection-oriented network, utilization of a trunk carried on a link connected to the switch is monitored and, if said utilization of said trunk exceeds a first threshold, a first degree of adaptation is initialized wherein use of the trunk by further connections is prevented. Subsequent degrees of adaptation are triggered when high utilization continues and surpasses higher thresholds. The subsequent degrees of adaptation involve rerouting connections that make use of the trunk.

46 Claims, 6 Drawing Sheets

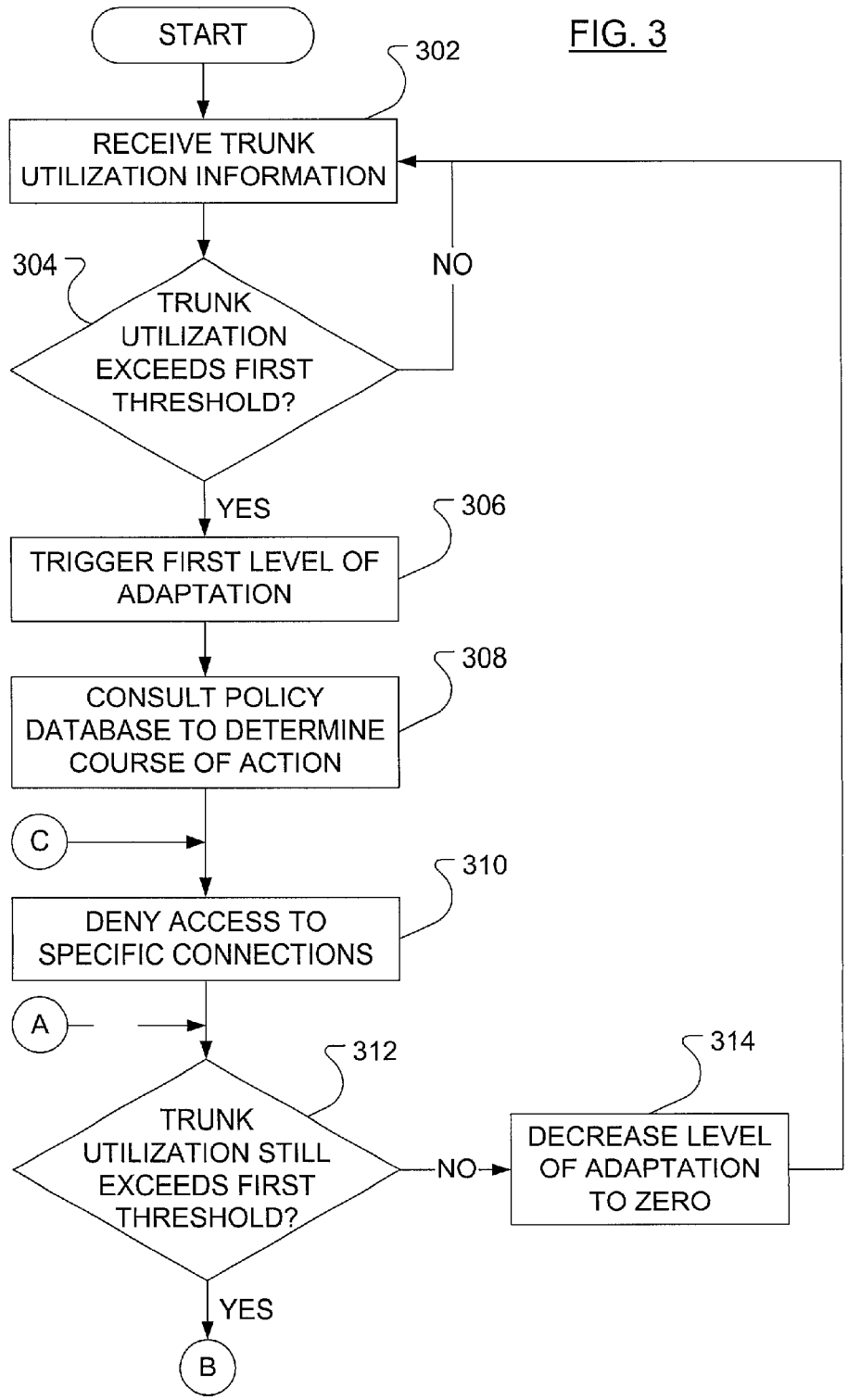

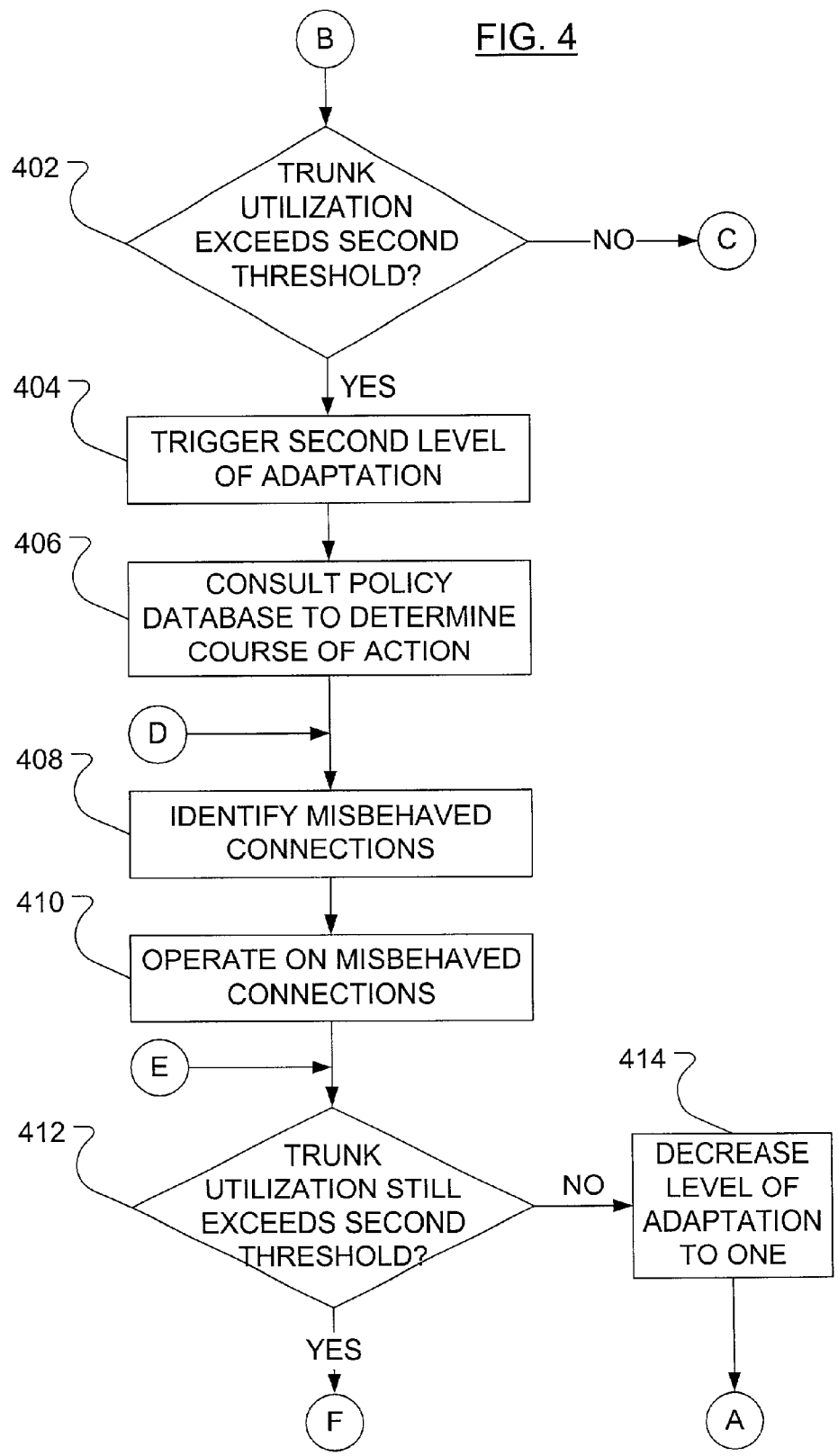

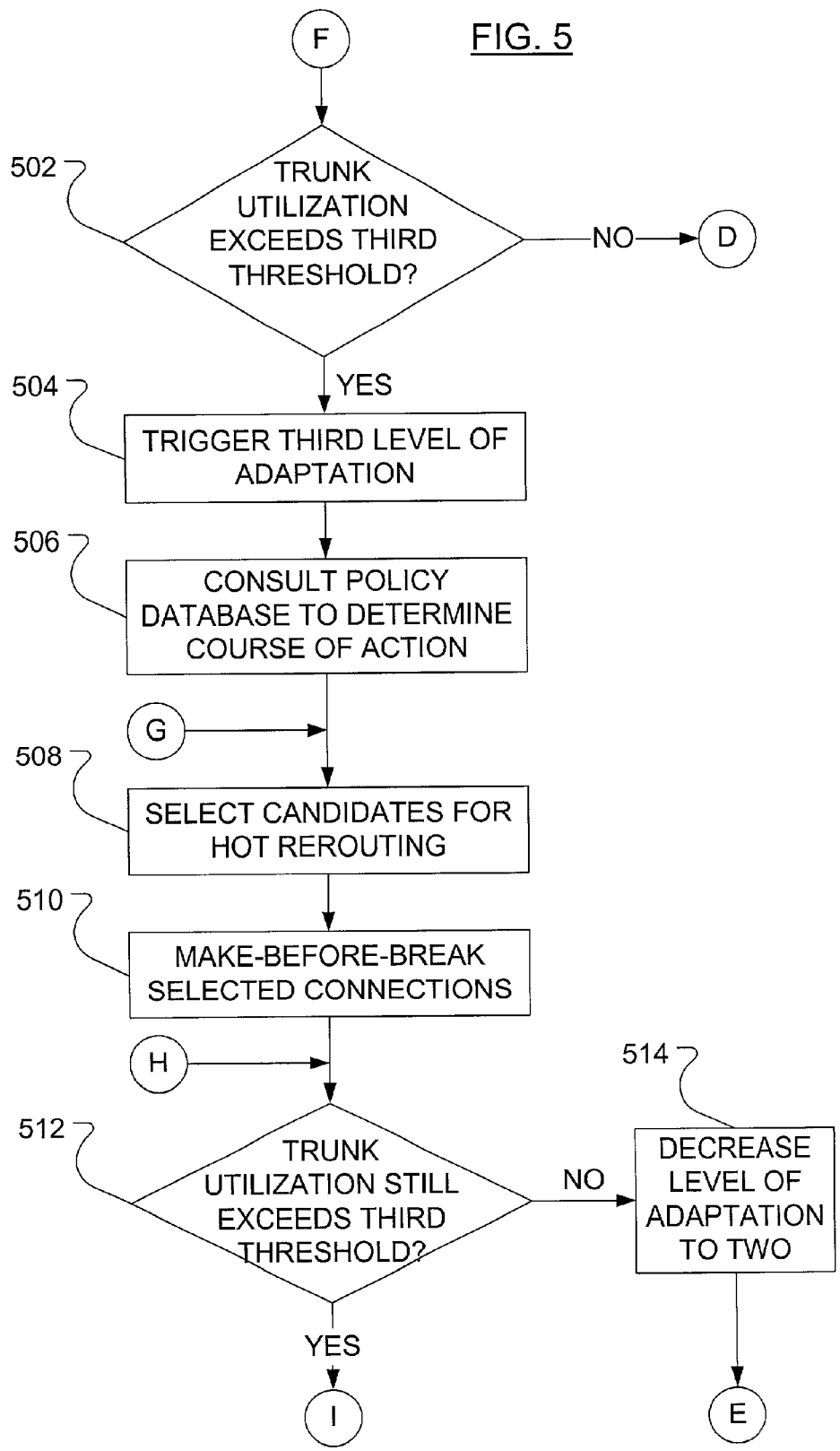

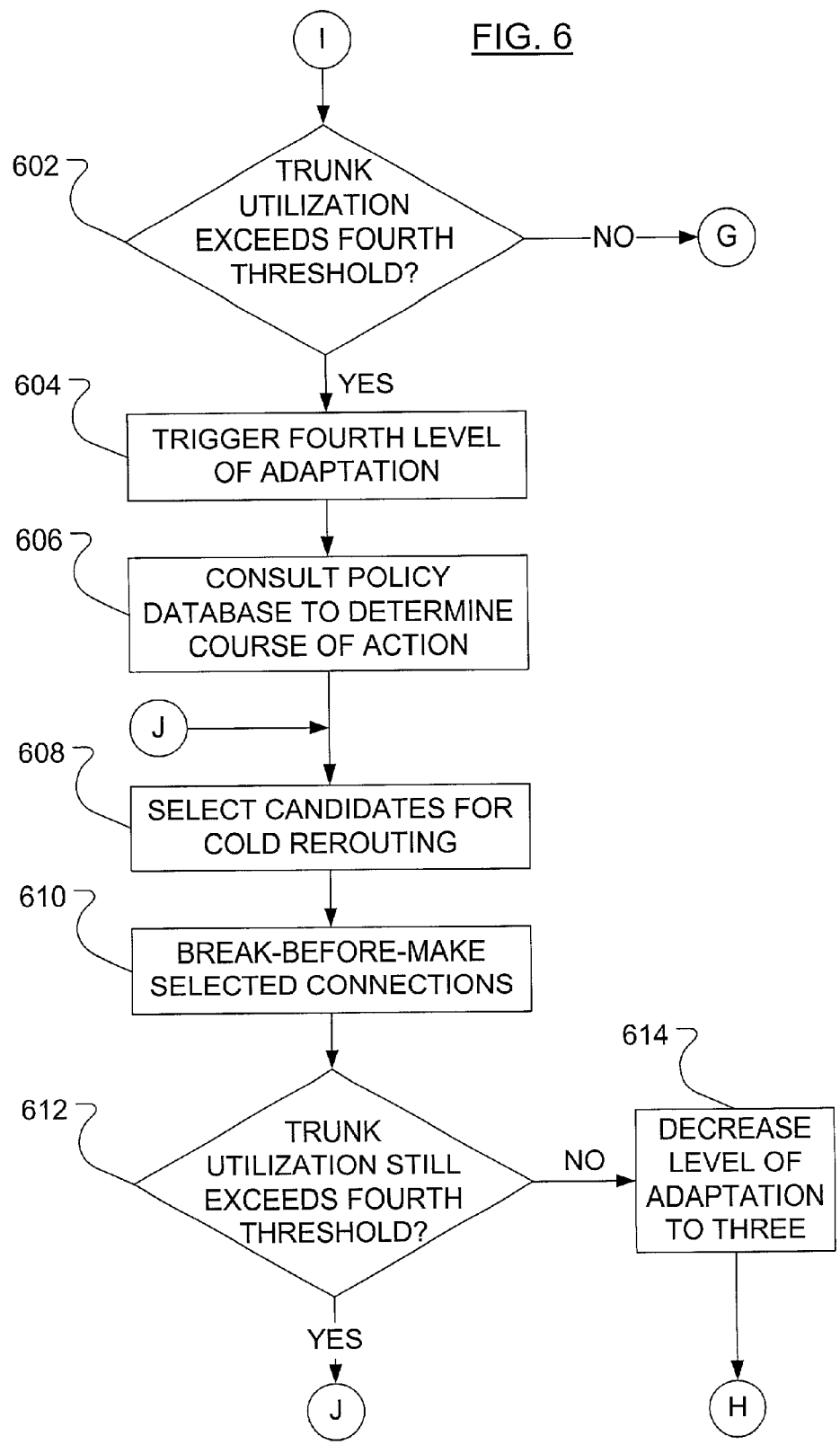

DYNAMIC ADAPTATION TO CONGESTION IN CONNECTION-ORIENTED NETWORKS

FIELD OF THE INVENTION

The present invention relates to connection-oriented networks and, more particularly, to dynamic adaptation to congestion in such networks.

BACKGROUND OF THE INVENTION

Increasingly, products are available to network service providers and enterprises alike that provide for and optimize the delivery of a variety of services including voice, data and video across wide area networks. In many instances, these wide area networks are connection-oriented, that is, a request is received for a connection through the network and a path is selected and established responsive to that request. Connection-oriented networks include many switches interconnected by links, where each link may be provisioned to carry one or more trunks, where a trunk is for carrying a voice or data channel between switches. Unfortunately, network congestion can occur when a number of channels are routed through paths that use the same trunk. Alternatively, an entire network may become congested when all trunks are being utilized for connections.

Connection-oriented networks are particularly well suited to path-oriented traffic (switched voice, permanent voice, video, etc.) but connectionless data may also be carried on the same trunks. Although these networks may carry both voice and data traffic, a customer of a network service provider may consider that one type of traffic should have priority over the other. For example, the customer may wish to prevent or bump voice traffic from a particular trunk in preference to data traffic during times of congestion or high utilization. Voice connections that have been prevented access to, or bumped from, the particular trunk may be rerouted, if possible, through other trunks or over the Public Switched Telephone network (PSTN).

Typically, control of connections has been concerned with Quality of Service (QoS) guarantees, related to such factors as delay or reserved bandwidth on links along a path from source to destination, and not with the degree of congestion on a given network. However, as congestion increases in connection-oriented networks, there is a need for dynamic control of connections so that the networks may adapt to various congestion scenarios.

SUMMARY OF THE INVENTION

The method of the present invention involves dynamic adaptation of connection-oriented networks to congestion such that, once congestion is encountered, dynamic adaptation steps may be performed. Different adaptation steps are proposed for reacting to different network congestion scenarios. It is further recommended that the steps are performed in a particular order such that the higher severity and longer sustentation of the network congestion, the more strict the step that is performed to alleviate the network congestion.

Advantageously, the proposed method allows connection-oriented traffic to react to various networks congestion scenarios. By preventing new connections on highly congested trunks, these new connections may be established avoiding areas of high congestion. By targeting misbehaved connections or traffic classes, action may be taken on targeted misbehaved connections or traffic classes first so that the network congestion may be efficiently alleviated without affecting other well-behaved connections or traffic classes. By rerouting and preemption of connections, existing connections may be rerouted through alternate paths such that a congestion condition is alleviated and the network resources are more efficiently utilized.

In accordance with one aspect of the present invention there is provided a method of adaptively routing connections through a connection-oriented data network, where the connection-oriented data network includes a plurality of switches and a plurality of links connecting the switches. The method includes, at a given one of the plurality of switches, receiving an indication of a utilization of a trunk carried on one of the plurality of links, where the one of the plurality of links connects to the given one of the plurality of switches and if the utilization of the trunk exceeds a first threshold, initializing a first degree of adaptation. In another aspect of the present invention, a path administrator is provided for carrying out this method. In a further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 3 illustrates steps of a first level of a dynamic adaptation method in accordance with an embodiment of the present invention;

FIG. 4 illustrates steps of a second level of a dynamic adaptation method in accordance with an embodiment of the present invention;

FIG. 5 illustrates steps of a third level of a dynamic adaptation method in accordance with an embodiment of the present invention; and FIG. 6 illustrates steps of a fourth level of a dynamic adaptation method in accordance with an embodiment of the present invention.

DETAILED DESCRIPTION

Figure 1:
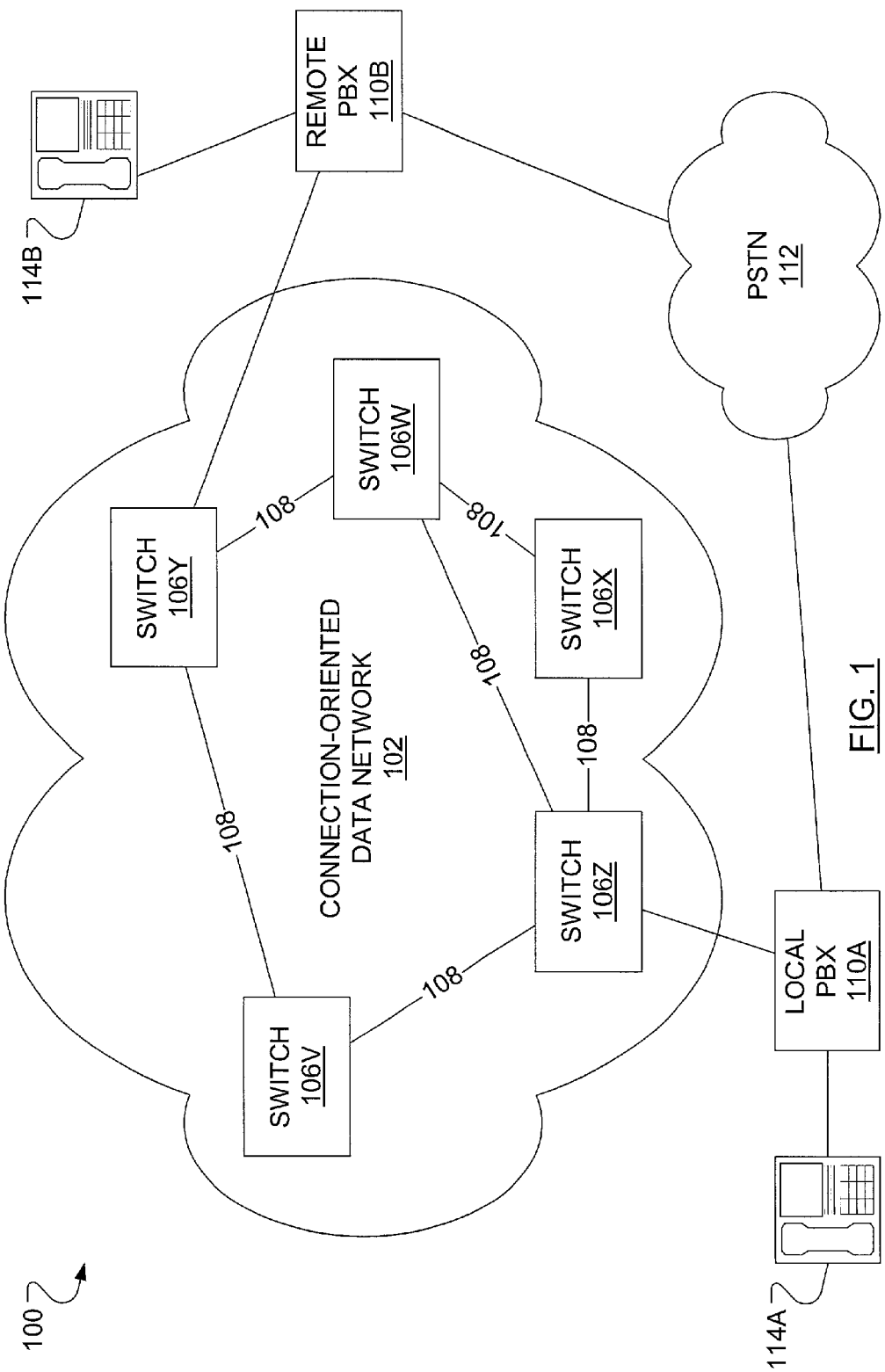
FIG. 1 schematically illustrates a communication system for use with an embodiment of the present invention.

FIG. 1 illustrates a communication system 100 that includes a connection-oriented data network 102 including a number of switches 106V, 106W, 106X, 106Y, 106Z connected by a number of links 108 (also referred to as an individual link 108). The links 108 may be provisioned to carry trunks. The connection-oriented data network 102 may be used to connect a local private branch exchange telephone system (PBX) 110A to remote PBX 110B thereby facilitating a voice connection between a local telephone station apparatus 114A and a remote telephone station apparatus 114B. Alternatively, the local PBX 110A may connect to the remote PBX 110B via a public switched telephone network (PSTN) 112. The connection-oriented data network 102 may carry many types of data traffic including, Asynchronous Transfer Mode (ATM) traffic, frame relay traffic, Multi-Protocol Label Switched (MPLS) traffic, Internet Protocol (IP) traffic, etc.

A network exemplary of the connection-oriented data network 102 would employ a connection-oriented routing system for selecting, establishing and managing connections for various services. The routing system may be based on a centralized scheme, a distributed scheme or a hybrid of the two schemes. Responsive to a connection request, a network using the routing system selects a route through the network from a source to a destination (specified in the connection request), establishes a path along that route and then manages the path. In particular, a path management function of the routing system provides switches in the network with capabilities to respond to facility (link, switch or hardware) failures or preemption along the established path by rerouting the path to another route. Further included in the path management function are capabilities to monitor the path to determine whether the path can be rerouted to a more optimal route. Once a path is established by the routing system, the services may start using it for data transfer.

Connection-oriented routing systems fitting the above description are described in: ATM Forum Technical Committee, "Private Network-Network Interface Specification Version 1.0 (PNNI 1.0)," af-pnni-0055.000, March 1996; R. Callon, et al, "A Framework for Multiprotocol Label Switching", Work in Progress, November 1997; E. Rosen, et al, "Multiprotocol Label Switching Architecture", Work in Progress, July 1998; Bilel Jamoussi, "Constraint-Based LSP Setup using LDP," draft-ietf-mpls-cr-ldp-03.txt, Work in progress, September 1999; and Awduche, et al, "RSVP-TE: Extensions to RSVP for LSP Tunnels," draft-ietf-mpls-rsvp-lsp-tunnel-05.txt Network Working Group, Internet Draft, all of which are hereby incorporated herein by reference.

Networks typical of the connection-oriented data network 102 typically include a means (not shown) for the various switches 106V, 106W, 106X, 106Y, 106Z to communicate with one another to exchange operations, administration, maintenance and provisioning (OAM&P) information. This communications means may include a Common Channel Signaling (CCS) scheme. Such an OAM&P information exchange may be used to establish and maintain paths through the connection-oriented data network 102.

Figure 2:
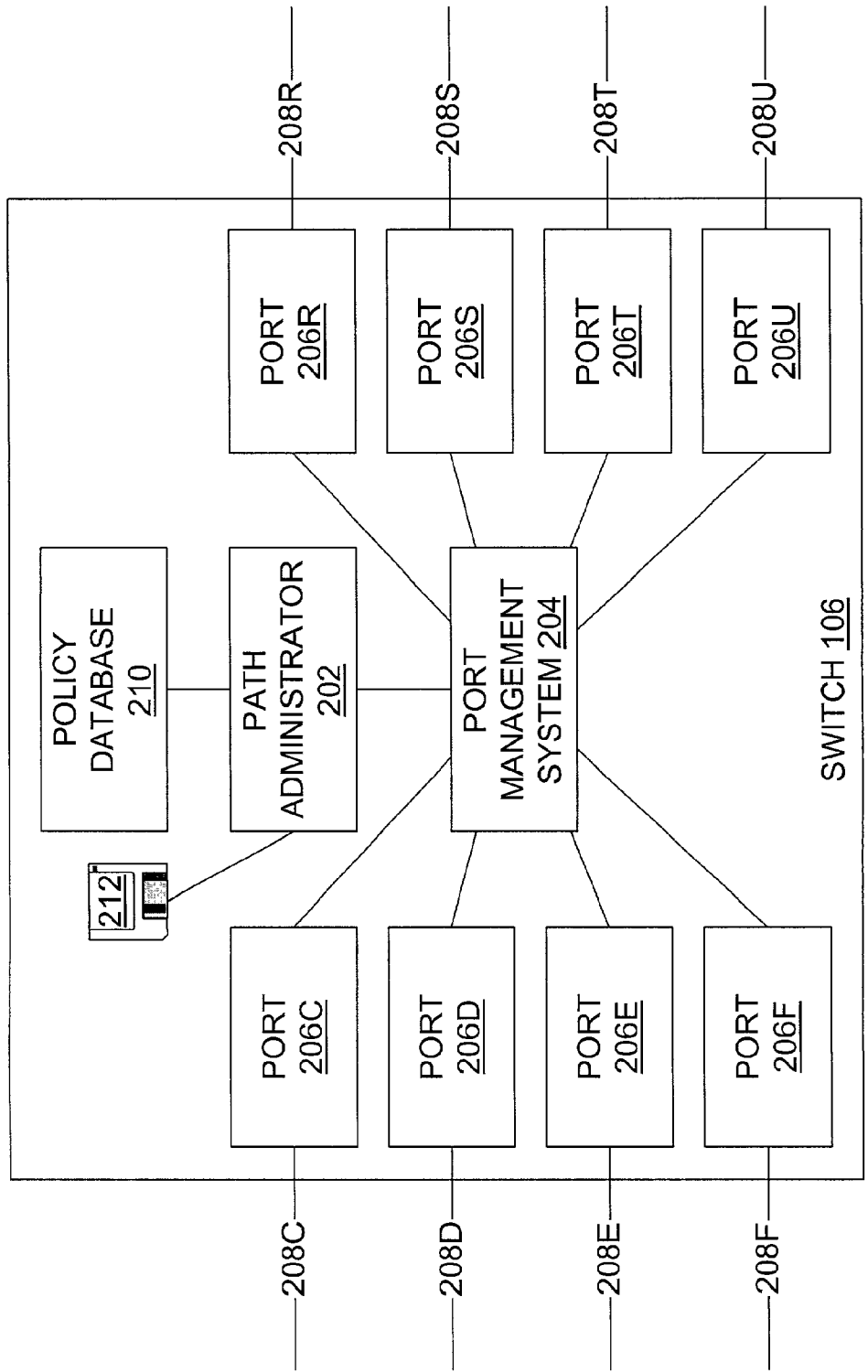
FIG. 2 schematically illustrates a switch suitable for use with an embodiment of the present invention.

A switch 106, typical of switches 106V, 106W, 106X, 106Y, 106Z in FIG. 1, may be examined in detail in FIG. 2. The switch 106 is shown to include a number of ports 206C, 206D, 206E, 206F, 206R, 206S, 206T, 206U (referred to collectively as ports 206 and individually as port 206). Each port 206 connects to a corresponding trunk 208C, 208D, 208E, 208F, 208R, 208S, 208T, 208U (referred to collectively as trunks 208 and individually as trunk 208) and a port management system 204 for managing the ports 206. Further included is a path administrator 202 for exchanging signaling with other switches for establishing paths through the connection-oriented data network 102 (FIG. 1). The path administrator 202 maintains a connection to a policy database 210. The path administrator 202 may be loaded with routing system software for executing methods exemplary of this invention from a software medium 212 which could be a disk, a tape, a chip or a random access memory containing a file downloaded from a remote source.

In an exemplary application in view of FIG. 1, the local PBX 110A sends a request to the local switch 106Z for a connection to the remote switch 106Y that is connected to the remote PBX 110B. A connection-oriented routing system provides the local switch 106Z with information about bandwidth available in the connection-oriented data network 102. Given this information, the local switch 106Z may select a path for the requested connection and establish the path for the connection through communication with the switches 106 along the path. While the path is in use, serving the connection, trunks 208 in each link 108 in the path may be maintained by switches 106 along the path that are either at a transmitting end or a receiving end of the trunk 208.

In overview, an adaptation method is disclosed for adaptively routing connections through the connection-oriented data network 102 based on utilization of trunks 208 that are carried on the links 108. The adaptation method of the present invention involves policy driven dynamic adaptation of connection-oriented networks such that, once congestion is detected, a policy database may be consulted that specifies particular adaptation steps to perform, how to perform the steps and on which connections to perform the steps. One adaptation step that may be performed, with regard to a particular trunk on which congestion has been encountered, involves the prevention of new connections (voice and others) from being established on the particular trunk. Another adaptation step involves identifying misbehaved connections and performing specific operations on the misbehaved connections. A further adaptation step that may be performed involves hot rerouting existing connections. Hot re-routing is a routing scheme that is often referred to as a "make-before-break" scheme. In such a scheme, a second path is established for a given connection while an earlier established path continues to carry data for the given connection. If the second path is successfully established, the given connection is switched from the first path to the second path. The first path is then destroyed leaving only the second path. In contrast to hot rerouting, cold rerouting, which is another possible adaptation step, involves terminating the earlier established path and subsequently establishing a second path for the given connection. Cold rerouting is often referred to as a "break-before-make" scheme. Hot rerouting minimizes data loss associated with rerouting a connection and is therefore preferred over cold rerouting. Typically, then, hot rerouting is attempted before cold rerouting.

Rerouting an entire path, as described above, may be termed "global rerouting." Notably, there may be situations that are more efficiently handled by "local rerouting." In local rerouting, the majority of an existing path is maintained, while a segment of the existing path is rerouted to avoid a congested trunk. The source of the segment may be the switch that is performing the adaptation method of the present invention, or may be a switch that precedes the switch that is performing the adaptation method in the existing path.

The selection of a particular connection on which to perform the various adaptation steps may be influenced by qualities of the connections, as stored in the policy database 210. Such qualities may include a priority of the connection, typically implemented using setup priority and holding priority. Setup priority specifies a degree of importance associated with establishing a particular connection, while holding priority specifies a degree of importance associated with maintaining reserved bandwidth for an established connection. In particular, the path administrator 202 may consult the policy database 210 to determine specific connections to prevent from being established. For instance, under a given degree of congestion, the path administrator 202 may prevent voice connections from using the trunk for which the path administrator 202 is responsible, while accepting data connections.

Further, consistently misbehaved connections may be identified, where misbehaved connections are those connections that exceed a given bandwidth (which may be described in a contract between a network service provider and a customer). Upon identifying these misbehaved connections, the path administrator 202 may consult the policy database 210 to determine an adaptation step to perform or may alter the policy database 210 to reduce the priority of the misbehaved connections. The path administrator 202 may consult the policy database 210 to determine specific connections to reroute and how (i.e., hot or cold). Although the above refers to specific connections, it will be apparent to a person skilled in the art that decisions may also be made regarding classes of traffic (i.e., switched voice, streaming video data, etc.) that encompass a number of connections.

The adaptation method is triggered for a particular trunk when utilization of the trunk is sustained above a predetermined threshold for a configured duration. According to the present invention, actions are taken in a progressive manner. Four different degrees of adaptation can be triggered based on four utilization thresholds. Levels one, two, three and four are used to refer to the adaptation level after the routing system starts a first, second, third and fourth degree of adaptation, respectively. If, for a particular trunk, the routing system adaptation level is one, the routing system may prevent specific new connections from being established on the particular trunk based on setup priority; if routing system adaptation level is two, the routing system identifies misbehaved connections and operates on the identified connections; if routing system adaptation level is three, the routing system hot reroutes (if possible) connections based on holding priority; if routing system adaptation level is four, the routing system cold reroutes connections based on holding priority.

An indication of the utilization of a particular trunk 208 may be received by the path administrator 202 from the port management system 204 (step 302, FIG. 3). While the adaptation level is zero, i.e., while adaptation is not active, the utilization of the particular trunk 208 is monitored. If the utilization of the particular trunk 208 exceeds a first threshold for a preset upgrade duration (step 304), the path administrator 202 triggers a first degree of adaptation (step 306), wherein the path administrator 202 consults the policy database 210 to determine a course of action (step 308). Triggering the first degree of adaptation (step 306) includes increasing the adaptation level to one. When the adaptation level is increased to one, the path administrator 202 advertises to the other switches 106 that the particular trunk 208 is in adaptation mode. The policy database 210 may indicate that only specific new connections (as defined by, for instance, class or setup priority) are to be allowed by the path administrator 202 on the particular trunk 208 (step 310).

While the adaptation level is one, if the utilization of the particular trunk 208 remains high and exceeds a second threshold for the preset upgrade duration (step 402, FIG. 4), the path administrator 202 starts the second degree of adaptation (step 404, FIG. 4) and the adaptation level is increased to two. Otherwise, if the utilization of the particular trunk 208 falls below the first threshold for a second number of consecutive minutes (step 312), the adaptation level is decreased to zero (step 314), meaning that all new connections on the particular trunk 208 can be accepted. When adaptation is no longer active (i.e., the adaptation level is zero), the path administrator 202 advertises to the other switches 106 that the particular trunk 208 is no longer in adaptation mode. Hence, new connections may be setup on paths that use the particular trunk 208.

Preventing new connections from being established on particular trunk 208 may be, for example, accomplished by advertising to the other switches 106 that an available bandwidth on the particular trunk 208 is zero.

When the path administrator 202 triggers the second degree of adaptation (step 404, FIG. 4), the path administrator 202 consults the policy database 210 to determine a course of action (step 406). The policy database 210 may indicate that the path administrator 202 is to assess whether any connections may be identified as being misbehaved (step 408). The path administrator 202 may then operate on the connections identified as misbehaved (step 410). Operating on the misbehaved connections may include sending a congestion notification to a source of each misbehaved connection. Such congestion notifications are well known in the art and, ideally, result in the source reducing the volume of traffic sent on the misbehaved connection. Alternatively, or additionally, operating on the misbehaved connections may include altering the policy database 210 so that the various priorities (setup and holding) of the misbehaved connections are reduced.

While the adaptation level is two, if the utilization of the particular trunk 208 remains high (step 412) and exceeds a third threshold for the preset upgrade duration (step 502, FIG. 5), the path administrator 202 starts the third degree of adaptation (step 504) and the adaptation level is increased to three. Otherwise, if the trunk utilization falls back below the second threshold for the preset downgrade duration, the adaptation level is decreased to one (step 414).

When the path administrator 202 starts the third degree of adaptation (step 504, FIG. 5), the path administrator 202 consults the policy database 210 to determine a course of action (step 506). The policy database 210 may indicate that the path administrator 202 is to select some connections as candidates for hot rerouting (step 508). The first connections considered for selection may be those that have the lowest holding priority, as determined by consulting the policy database 210. The number of connections to hot reroute is determined dynamically, such that the total reserved bandwidth of the candidate connections is greater than the amount bandwidth to be freed up so that the particular trunk 208 is brought out of congestion. For each candidate connection, the path administrator 202 causes the candidate connection to perform a make-before-break procedure (step 510). The make-before-break procedure requires that an alternate path for the candidate connection be sought. If an alternate path cannot be found, use of the current path continues. Otherwise the connection is established on the alternate path and, once the connection has been established, use of the original path is discontinued.

Although the make-before-break procedure is described above in conjunction with an entire path (global hot rerouting), the procedure may, instead, be performed on a segment of the path (local hot rerouting). Consider a scenario, in view of FIG. 1, wherein the path administrator 202 starts the third degree of adaptation, as part of a first switch 106Z, for a trunk between the first switch 106Z and a second switch 106W. The make-before-break procedure may reroute a selected candidate connection to the second switch 106W via a third switch 106X. Advantageously, when the make-before-break procedure is performed on a segment of a path, the rerouting may be performed by the switch 106 that is performing the adaption. In contrast, when the make-before-break procedure is performed on an entire path, the switch 106 that is performing the adaption must exchange signaling with the switch at the origin of the path to request rerouting of the path.

While the adaptation level is three, if the utilization of the particular trunk 208 remains high (step 512) and exceeds a fourth threshold for the preset upgrade duration (step 602, FIG. 6), the path administrator 202 starts the fourth degree of adaptation (step 604) and the adaptation level is increased to four. Otherwise, if the trunk utilization falls back below the third threshold for the preset downgrade duration, the adaptation level is decreased to two (step 514).

When the path administrator 202 starts the fourth degree of adaptation (step 604), the path administrator 202 consults the policy database 210 to determine a course of action (step 606). In a manner similar to the actions taken when the path administrator 202 starts the third degree of adaptation, the policy database 210 may indicate that the path administrator 202 is to select some connections as candidates for cold rerouting (step 608). The first connections considered for selection may be those that have the lowest holding priority, as determined by consulting the policy database 210. The number of connections to cold reroute is determined dynamically, such that the total reserved bandwidth of the candidate connections is greater than the amount of bandwidth to be freed up so that the particular trunk 208 is brought out of congestion. For each candidate connection, the path administrator 202 causes the candidate connection to perform a break-before-make procedure (step 610). The break-before-make procedure causes the candidate connection to terminate immediately and attempt to re-establish the candidate connection using an alternate path that excludes the particular trunk 208.

As in the case of hot rerouting, cold rerouting (the break-before-make procedure) may be performed on a segment of a path (local cold rerouting) rather than the entire path (global cold rerouting).

While the adaptation level is four, if the utilization of the particular trunk 208 falls below the fourth threshold for the preset downgrade duration, the adaptation level is decreased to three (step 614). For both the third and fourth adaptation levels, the path administrator 202 can reroute continuously. That is, after the path administrator 202 reroutes some connections (using make-before-break or break-before-make), if the utilization of the particular trunk 208 remains above the associated threshold (third or fourth, depending on the adaptation level) for an additional preset duration, more connections are rerouted.

Although the order of adaptation courses of action is presented above as: deny access to new connections; operate on misbehaved connections; hot reroute existing connections; and cold reroute existing connections, it should be apparent to a person skilled in the art that the adaptation courses of action may be arranged to occur in a different order. Alternatively, not all of the above adaptation courses of action need necessarily to be performed to contribute to a working routing system. However, it should be clear that the above order of adaptation courses of action is preferred and tends to minimize data loss due to rerouting.

Adaptation can be active only when a trunk is up and running. If, after adaptation changes to active, the trunk becomes disabled, utilization monitoring of the trunk is turned off. After the trunk is re-enabled adaptation is initialized as inactive and utilization monitoring resumes.

Current routing systems may be configured to use an optimization algorithm to periodically attempt to find an alternate path for existing connections. Such an alternate path may be selected to minimize a particular metric, say cost or delay.

The adaptation method of the present invention may be used in conjunction with such optimization algorithms in that, when the first degree of adaptation is initiated, the path administrator 202 advertises that adaptation is ongoing on the particular trunk. This advertising allows the trunk to be tagged as adapting in an optimization algorithm. The optimization algorithm may then attempt to find an alternate path for existing connections that use the particular trunk. Additionally, the optimization algorithm may exclude the particular trunk from being eligible to be selected as part of an alternate path for any other connections. This behavior is desirable.

When the third/fourth degrees of adaptation are initiated for a particular trunk, the path administrator 202 may select candidate connections for hot/cold rerouting based on a policy, which could use holding priority, or may reroute all voice calls first and then all data calls. It is notable that, when adaptation is no longer active, an optimization algorithm may return the candidate connection to the path that employs the particular trunk. The returned connections may then cause high utilization on the particular trunk and be rerouted again. In particular, if these connections are misbehaved, this may cause path oscillation in the network. Several approaches can be used to prevent/reduce this problem, which are listed as follows:

when configuring the preset upgrade duration that leads to the upgrade of adaptation level (e.g., from level one to level two) or the preset downgrade duration that leads to the downgrade of adaptation level, set the preset downgrade duration relatively larger than the preset upgrade duration;

negotiate with customers associated with misbehaved connections, which send more traffic than reserved bandwidth, to increase the bandwidth reservations for these connections; and perform rerouting on one class of connections before another class of connection, based on expected behavior characteristics of the one class of connections.

In an example of the third above approach, switched voice connections are rerouted first, since switched voice connections are setup dynamically and are terminated after the connections are no longer required. Thus, when utilization of a trunk is high, the switched voice connections are rerouted away from the trunk, and when the trunk congestion/high utilization has subsided, the rerouted connections may be terminated already. Also, if cold rerouting the switched voice connections and no path is available within the connection-oriented data network 102, the connections can be rerouted via a PSTN.

Advantageously, the adaptation method described herein allows connection-oriented traffic to better react to network congestion scenarios. First of all, by prevention of new connections on a trunk, the new connections may be established elsewhere on the network to avoid areas of high congestion. Secondly, by identifying misbehaved connections or traffic classes, action may be taken first on these misbehaved connections or traffic classes to efficiently alleviate the networks congestion without affecting other well-behaved connections or traffic classes. Thirdly, by hot/cold rerouting of connections, the existing connections may be rerouted through alternate paths (or path segments) such that the congestion condition is alleviated and the network resources are better and more efficiently utilized. Especially for the case of hot rerouting, the data loss during rerouting is minimized. Finally, by dynamic control of traffic during network congestion, the quality of traffic is better maintained.

Other modifications will be apparent to those skilled in the art and, therefore, the invention is defined in the claims.

We claim:

1. A method of adaptively routing connections through a connection-oriented data network, said connection-oriented data network including a plurality of switches and a plurality of links connecting said plurality of switches, said method comprising:
   at a given one of said plurality of switches,
      receiving an indication of a utilization of a trunk carried on one of said plurality of links, where said one of said plurality of links connects to said given one of said plurality of switches, wherein said utilization of said trunk corresponds to a congestion level of said trunk, and
      if said utilization of said trunk exceeds a first threshold, initializing a first degree of adaptation, wherein said first degree of adaptation comprises preventing new connections having specific characteristics from being established on said trunk and wherein said specific characteristics relate to whether said new connections are voice or data connections.

2. The method of claim 1 further comprising, responsive to said initializing said first degree of adaptation, consulting a policy database to determine a course of action.

3. The method of claim 1 wherein voice connections are prevented and data connections are accented.

4. The method of claim 3 wherein said specific characteristics further relate to a priority of said new connections.

5. The method of claim 3 wherein said specific characteristics further relate to a destination of said new connections.

6. The method of claim 3 wherein said specific characteristics further relate to a source of said new connections.

7. The method of claim 1 wherein said initializing said first degree of adaptation comprises indicating to other switches of said plurality of switches that adaptation is active on said trunk.

8. The method of claim 7 further comprising, if said utilization of said trunk falls below said first threshold for a preset downgrade duration, indicating to other switches of said plurality of switches that said first degree of adaptation is no longer active on said trunk.

9. The method of claim 1 further comprising, if said utilization of said trunk exceeds a second threshold, initializing a second degree of adaptation.

10. The method of claim 9 further comprising, responsive to said initializing said second degree of adaptation, consulting a policy database to determine a course of action.

11. The method of claim 10 wherein said second degree of adaptation comprises identifying a misbehaved connection, among a plurality of connections using said trunk.

12. The method of claim 11 further comprising sending a congestion notification to a source of said misbehaved connection.

13. The method of claim 11 further comprising altering said policy database to reduce a priority associated with said misbehaved connection.

14. The method of claim 9 further comprising, if said utilization of said trunk exceeds a third threshold, initializing a third degree of adaptation.

15. The method of claim 14 further comprising, responsive to said initializing said third degree of adaptation, consulting a policy database to determine a course of action.

16. The method of claim 14 wherein said third degree of adaptation comprises:
   selecting a candidate connection, among said plurality of connections using said trunk, for rerouting, where said candidate connection is associated with a path between a source and a destination, where said trunk is a segment of said path and said trunk connects said given one of said plurality of switches to a second one of said plurality of switches; and
   acting such that said candidate connection is switched to an alternate path between said source and said destination, where said alternate pat excludes said trunk.

17. The method of claim 16 wherein said selecting said candidate connection is based on specific characteristics of said plurality of connections using said trunk.

18. The method of claim 16 wherein said acting comprises sending a rerouting request to a third one of said plurality of switches, where said third switch precedes said given one of said plurality of switches in said path.

19. The method of claim 18 wherein said third switch is said source of said candidate connection.

20. The method of claim 18 wherein said rerouting request indicates that said candidate connection should be established on said alternate path before said candidate connection is removed from said path.

21. The method of claim 16 wherein said acting comprises determining an alternate path segment, where said alternate pat segment connects said given one of said plurality of switches said second one of said plurality of switches and excludes said trunk.

22. The method of claim 21 further comprising:
   establishing said candidate connection on said alternate path; and
      responsive to said establishing, removing said candidate connection from said truck.

23. The method of claim 16 further comprising, if said utilization of said trunk continues to exceed said third threshold for a preset duration, repealing said selecting and acting for an additional candidate connection.

24. The method of claim 14 further comprising, if said utilization of said trunk exceeds a fourth threshold, initializing a fourth degree of adaptation.

25. The method of claim 24 further comprising, responsive to said initializing said fourth degree of adaptation, consulting a policy database to determine a course of action.

26. The method of claim 24 wherein said fourth degree of adaptation comprises;
   selecting a further candidate connection, among said plurality of connections using said trunk, for further rerouting, where said further candidate connection is associated with a further path between a further source and a further destination, where said trunk is a further segment of said further path; and
   acting such that said further candidate connection is switched to a further alternate path between said further source and said further destination, where said further alternate path excludes said trunk.

27. The method of claim 26 wherein said selecting said further candidate connection is based on said specific characteristics of said plurality of connections using said trunk.

28. The method of claim 26 wherein said acting comprises sending a further rerouting request to a third one of said plurality of switches, where a third switch precedes of said given one of said plurality of switches in said further path.

29. The method of claim 28 wherein said further rerouting request indicates that said further candidate connection should be removed from said further path before said further candidate connection is established on said further alternate path.

30. The method of claim 9 further comprising, if said utilization of said trunk falls below said second threshold for a preset downgrade duration, reducing from said second degree of adaptation to said first degree of adaptation.

31. The method of claim 14 further comprising, if said utilization of said trunk falls below said third threshold for a preset downgrade duration, reducing from said third degree of adaptation to said second degree of adaptatiom.

32. A path administrator in a switch in a connection-oriented data network, said path administrator operable to:
    receive an indication of a utilization of a trunk carried on a link connected to said switch, wherein said utilization of said trunk corresponds to a congestion level of said trunk; and
    initialize a first degree of adaptation if said utilization of said trunk exceeds a first threshold, wherein said first degree of adaptation comprises preventing new connections having specific characteristics from being established on said trunk and wherein said specific characteristics relate to whether said new connections are voice or data connections.

33. A path administrator in a switch in a connection-oriented data network, said path administrator comprising:
    a receiver for receiving an indication of a utilization of a trunk carried on a link connected to said switch, wherein said utilization of said trunk corresponds to a congestion level of said trunk; and
    means for initializing a first degree of adaptation if said utilization of said trunk exceeds a first threshold, wherein said means for initializing the first degree of adaptation comprises means for preventing new connections having specific characteristics from being established on said truck and wherein said specific characteristics relate to whether said new connections are voice or data connections.

34. The path administrator of claim 33 further comprising means for consulting a policy database to determine a course of action.

35. The path administrator of claim 34 wherein voice connections are prevented and data connections are accented.

36. The path administrator of claim 33 further comprising means for indicating to other switches of said plurality of switches that adaptation is active on said trunk.

37. The path administrator of claim 36 wherein said means for indicating further comprises means for indicating to other switches of said plurality of switches that said adaptation is no longer active on said trunk.

38. The path administrator of claim 33 further comprising means for identifying a misbehaved connection, among a plurality of connections using said trunk.

39. The path administrator of claim 33 further comprising;
    means for selecting a candidate connection, among a plurality of connections using said trunk, for rerouting, where said candidate connection is associated with a path between a source and a destination; and
    means for acting such that said candidate connection is switched to an alternate path between said source and said destination, where said alternate pat excludes said trunk.

40. A computer readable medium containing computer-executable instructions which, when performed by a processor in a switch in a connection-oriented data network, cause the processor to:
    receive an indication of a utilization of a trunk carried on a link connected to said switch, wherein said utilization of said trunk corresponds to a congestion level of said trunk; and
    initialize a first degree of adaptation if said utilization of said trunk exceeds a first threshold, wherein said first degree of adaptation comprises preventing new connections having specific characteristics from being established on said trunk and wherein said specific characteristics relate to whether said new connections are voice or data connections.

41. The computer readable medium of claim 40 wherein said computer-executable instructions further cause said processor to consult a policy database to determine a course of action responsive to said initializing said first degree of adaptation.

42. The computer readable medium of claim 40 wherein said computer-executable instructions further cause voice connections to be prevented and data connections to be accepted.

43. The computer readable medium of claim 40 wherein said computer-executable instructions further cause said processor to indicate to certain switches of a plurality of switches that adaptation is active on said trunk.

44. The computer readable medium of claim 43 wherein said computer-executable instructions further cause said processor to indicate to other switches of said plurality of switches that said adaptation is no longer active on said trunk if said utilization of said trunk falls below said first threshold for a preset downgrade duration.

45. The computer readable medium of claim 40 wherein said computer-executable instructions further cause said processor to identify a misbehaved connection, among a plurality of connections using said trunk.

46. The computer readable medium of claim 40 wherein said computer-executable instructions further cause said processor to:
    select a candidate connection, among a plurality of connections using said trunk, for rerouting, where said candidate connection is associated with a path between a source and a destination where said trunk is a segment of said path and said trunk connects a given one of a plurality of switches to a second one of said plurality of switches; and
    act such that said candidate connection is switched to an alternate path between said source and said destination, where said alternate path excludes said trunk.

* * * * *